Oct. 6, 1953     K. AHLIJIAN     2,654,483
CENTER CORE SEAL FOR FILTER ELEMENTS
Filed March 29, 1951
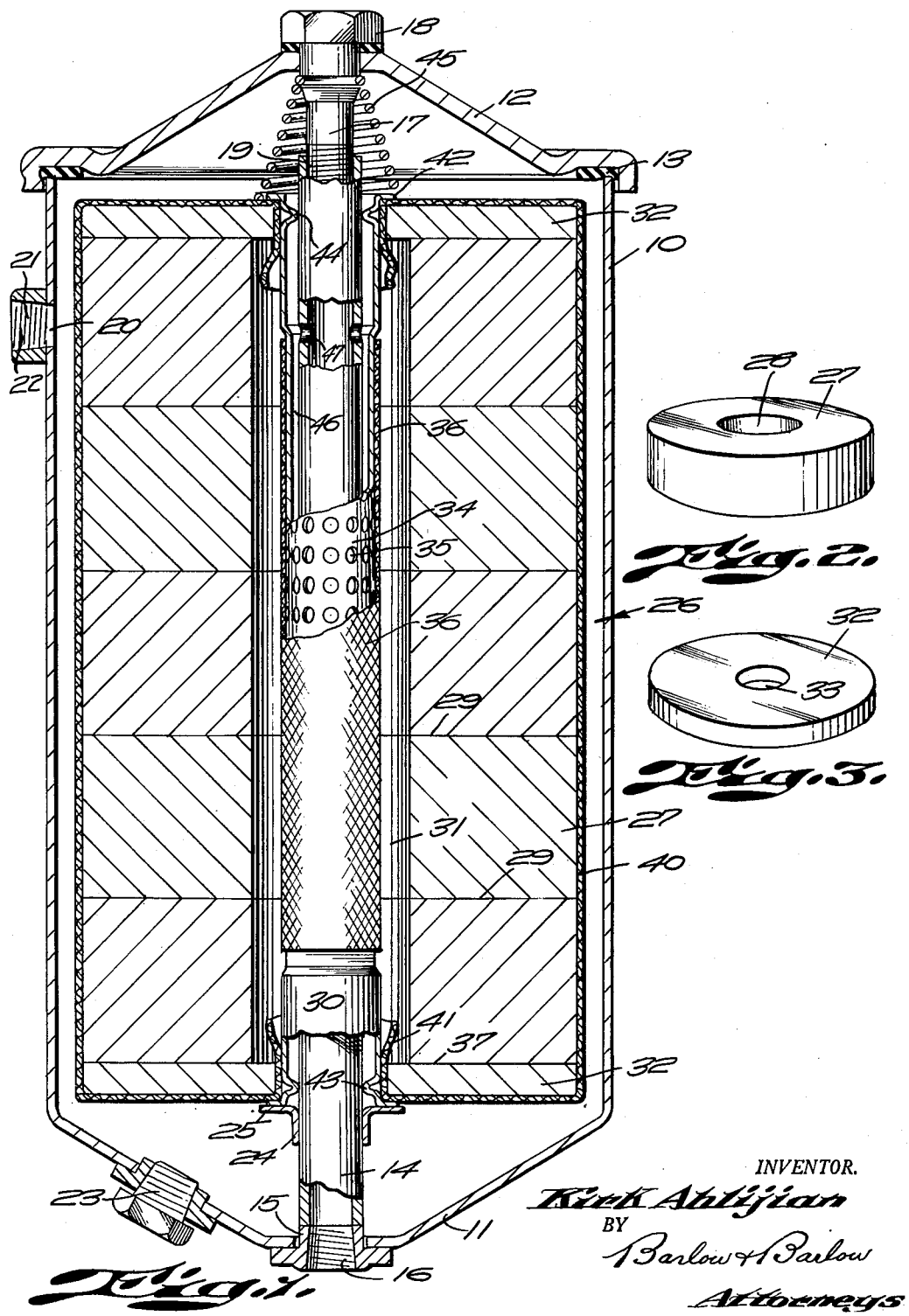
INVENTOR.
Kirk Ahlijian
BY
Barlow & Barlow
Attorneys Patented Oct. 6, 1953

2,654,483

UNITED STATES PATENT OFFICE 2,654,483

CENTER CORE SEAL FOR FILTER ELEMENTS

Kirk Ahlijian, Cranston, R. I., assignor to Fram Corporation, a corporation of Rhode Island Application March 29, 1951, Serial No. 218,235

5 Claims. (Cl. 210—169)

This invention relates to a filter of the type frequently used for liquids such for instance as the lubricant for an internal combustion engine.

In the use of certain materials for filtering, expansion or contraction takes place and some difficulty is encountered in the sealing of the filtering material as movement may occur along a center core.

One of the objects of this invention is to provide a cartridge which may maintain a sealed relationship at the ends of the core even though some expansion or contraction may occur.

Another object of the invention is to use the filtering material to seal the cartridge on the center core.

Another object of the invention is to provide an arrangement so that none of the filter material may contaminate the filtrate.

With these and other objects in view, the invention consists of certain novel features of construction as will be more fully described and particularly pointed out in the appended claims.

In the accompanying drawings:

Fig. 1 is a sectional view of a filter showing my invention;

Fig. 2 is a perspective view on a smaller scale of one of the members of filtering material;

Fig. 3 is a perspective view on a scale similar to Fig. 2 of one of the end members which provides the sealed relation.

In proceeding with this invention, I provide a filter cartridge which may be inserted in a case which comprises a center core of metal on which there is assembled a plurality of filter members. The end members have a tight sealing engagement with the core while the intermediate members have an opening sufficiently large so as to provide a chamber about the core. The core is reduced at a point spaced inwardly from its ends and along this reduced portion it is perforated. A covering of fabric extends along the reduced portion to cover the openings so as to prevent any particles of the filtering material from passing through the core openings through which the filtrate passes. A piece of fabric, usually knitted, extends over the entire outer surface of the material and is tucked into the ends about the core so as to provide a support and a retainer for the filtering material.

With reference to the drawings, 10 designates a cylindrical case having an integral bottom 11 and a removable cover 12 which engages a gasket 13 of soft material. A center tube 14 is secured to a flanged boss 15 welded in the bottom wall, which boss is provided with threads 16 for attachment to a drain conduit. The cover is secured in place by a screw 17 having a head 18 and engaging internal threads 19 of the center tube 14 to hold the cover in place. An inlet port is located at 20 with a boss 21 extending outwardly therefrom and threaded as at 22 for the connection of an inlet conduit. A drain plug 23 may be located in the bottom wall for drainage should it be desirable to drain the case.

A collar 24 having a supporting flange 25 is secured to the center tube 14 and provides a rest for the cartridge which is designated generally 26 and comprises a plurality of members 27 of filtering material usually of a cellulosic nature such as described in the Orr Patent No. 2,148,708, dated February 28, 1939. Each of these members 27 is cylindrical having a cylindrical opening 28. The members 27 are assembled with the openings 28 in registry and their outer surfaces also aligning and are cemented together at the juncture 29 as shown. A metal core 30 extends through the openings 28 and is of a size so as to be spaced from the walls of the opening 28 and provide an annular chamber 31. This annular chamber is closed at the opposite ends by disc like members 32 as shown in Fig. 3 which are cylindrical with a cylindrical hole 33 of a size to tightly engage the core 30. This core along the portion which is engaged by the members 32 is smooth and will permit of the members 32 sliding along the core. At a point inwardly from the portion engaged by the members 32 at any position of sliding, the core is reduced in diameter as at 34 and a plurality of openings 35 are provided in this reduced portion. A fabric 36 is located in this reduced portion 34 and covers the openings 35 so that none of the filter material should it become loose from the cake 27 or 32 could enter the filtrate stream. These end members 32 are also cemented to the members 27 at the juncture 37 so as to substantially be one piece with the plurality of members of filter material.

A fabric of knitted material 40 is drawn over the outer surface of the members 27 and 32 and tucked into the center openings 33 as at 41 so that when the core is positioned through the members, it will hold this material securely in place. The core is flanged at its ends as at 42 so as to hold the members 27 and 32 assembled thereon and the fabric 40 in place. The core is also deflected inwardly at its lower end 43 and also at its upper end 44 so as to tightly engage the center tube 14 and provide a sealed engagement therewith. The cartridge rests upon the flange 25 and is forced toward this flange by spring 45 which is assembled on the screw 17 which holds the cover in place. Should there be any expansion or contraction of the material 27 and 32, the spring will permit expansion by the sliding of the sealing disc 32 at the upper end upwardly or should there be any contraction of the cartridge, there will be a sliding of this disc along the core by reason of the spring to maintain the parts in contact and maintain a sealed relation between the core and the filtering material thereon. The cartridge is symetrical and either end may engage the flange 25.

In use, the liquid will enter at port 20, pass through the cartridge into chamber 31 thence through the fabric 36 through the openings 35 into the space 46 between the center tube and the core, and thence through opening 47 in the center tube and downwardly through the center tube and out at port 16.

I claim:

1. A filter cartridge comprising a tubular core for the reception of a center tube having perforations at locations spaced inwardly from its end portions, the unperforated end portions being of uniform cylindrical diameter, a plurality of members of fibrous filter material each having a central opening of a size larger than the core assembled in contiguous relation with said openings registering and through which openings said core extends spaced from the walls of said openings, end members of fibrous filtering material having openings the walls of which snugly fit and contact said tubular core and contacting the ends of said plurality of members to close the ends of said space about the core, at least one of said end members being slidable along and contacting said core as the members expand or contract.

2. A filter cartridge as in claim 1 wherein an outer skin of porous fabric covers said members.

3. A filter cartridge as in claim 1 wherein an outer skin of knitted porous fabric covers said members.

4. A filter cartridge as in claim 1 wherein the perforations of said core are covered with a porous fabric material.

5. A filter cartridge as in claim 1 wherein said core is of reduced diameter intermediate its ends and said perforations are in said portion of reduced diameter and a porous fabric covers the openings in said core.

KIRK AHLIJIAN.

References Cited in the file of this patent

UNITED STATES PATENTS

| Number | Name | Date |
|---|---|---|
| 739,146 | Bommarius | Sept. 15, 1903 |
| 1,930,209 | Milkey | Oct. 10, 1933 |
| 2,148,708 | Orr | Feb. 28, 1939 |
| 2,196,349 | West | Apr. 9, 1940 |
| 2,345,848 | Winslow et al. | Apr. 4, 1944 |
| 2,367,745 | Wicks | Jan. 23, 1945 |
| 2,487,146 | Lasky | Nov. 8, 1949 |
| 2,514,366 | Beyland | July 11, 1950 |
| 2,554,016 | Czarnecki, Jr. | May 22, 1951 |
| 2,575,995 | Briggs et al. | Nov. 20, 1951 |

FOREIGN PATENTS

| Number | Country | Date |
|---|---|---|
| 11,700 | Great Britain | July 17, 1897 |